United States Patent [19]
Hefner, Jr.

[11] Patent Number: 4,663,398
[45] Date of Patent: May 5, 1987

[54] CO-OLIGOMERIZATION PRODUCT OF A MIXED CYANATE AND A POLYMALEIMIDE AND EPOXY RESINS THEREOF

[75] Inventor: Robert E. Hefner, Jr., Lake Jackson, Tex.

[73] Assignee: The Dow Chemical Company, Midland, Mich.

[21] Appl. No.: 831,947

[22] Filed: Feb. 24, 1986

[51] Int. Cl.$^4$ .................... C08L 63/00; C08G 59/06; C08G 73/06
[52] U.S. Cl. .................................. 525/419; 525/404; 525/408; 525/523; 525/529; 525/533; 525/534; 525/539; 525/540; 528/96; 528/97; 528/98; 528/99; 528/117; 528/119; 528/120; 528/322
[58] Field of Search ............... 525/404, 408, 419, 523, 525/529, 533, 534, 539, 540; 528/96, 97, 98, 99, 117, 119, 120, 322

[56] References Cited

U.S. PATENT DOCUMENTS

| 4,393,188 | 7/1983 | Takahashi et al. | 525/404 |
| 4,487,915 | 12/1984 | Hefner, Jr. | 528/96 |
| 4,489,202 | 12/1984 | Hefner, Jr. | 528/95 |
| 4,506,063 | 3/1985 | Hefner, Jr. | 528/96 |
| 4,555,553 | 11/1985 | Hefner, Jr. | 528/523 |

Primary Examiner—Harold D. Anderson
Attorney, Agent, or Firm—James G. Carter

[57] ABSTRACT

Hydroxyaromatic oligomers are prepared by (I) reacting (A) an aromatic hydroxyl-containing material such as bisphenol A with (B) a cyanogen halide such as cyanogen bromide in the presence of a base such as triethylamine and (II) co-oligomerizing the cyanate-containing product from (I) with (C) a polymaleimide such as the reaction product of maleic anhydride with methylenedianiline optionally in the presence of (D) a co-oligomerization catalyst such as cobalt naphthenate. These oligomers are useful in the preparation of epoxy resins.

18 Claims, No Drawings

CO-OLIGOMERIZATION PRODUCT OF A MIXED CYANATE AND A POLYMALEIMIDE AND EPOXY RESINS THEREOF

BACKGROUND OF THE INVENTION

The present invention provides novel hydroxyaromatic oligomers prepared from co-oligomerization reaction of a mixed cyanate of a polyphenol with a polymaleimide, as well as epoxy resin compositions prepared from said oligomers.

Preparation of hydroxyaromatic oligomers containing triazine groups and polyepoxides thereof is taught by R. E. Hefner, Jr., in U.S. Pat. No. 4,489,202 issued Dec. 19, 1984. The process disclosed therein uses an easily prepared mixed cyanate of a diphenol or polyphenol. More specifically, the process disclosed comprises reacting at least one material having an average of more than one aromatic hydroxyl group per molecule with at least 0.01 but not more than 0.95 moles of cyanogen halide or mixture of cyanogen halides per aromatic hydroxyl group at a temperature and time sufficient to essentially complete the reaction and thereafter recovering the resultant cyanate mixture; trimerizing the resultant cyanate mixture in the presence of a suitable trimerization catalyst at a temperature and time to essentially complete the reaction, epoxidizing the resultant trimerized product in a conventional manner by reaction with an epihalohydrin with subsequent dehydrohalogenation with a basic-acting material and finally recovering the resultant triazine functional glycidyl ether product. Excellent control over the molecular weight and content of triazine groups is provided by this process. The resultant epoxy resin compositions posses unusually high thermal stability as well as excellent overall physical and mechanical properties.

Preparation of hydroxyaromatic oligomers containing triazine and oxazoline groups and polyepoxides thereof is taught by R. E. Hefner, Jr., in U.S. Pat. No. 4,487,915 issued Dec. 11, 1984. The process disclosed therein uses the aforementioned mixed cyanate of a diphenol or polyphenol. Co-oligomerization of this cyanate mixture with an epoxy resin, such as a diglycidyl ether of bisphenol A, provides hydroxyaromatic oligomers containing both triazine and oxazoline groups. Oligomers prepared from co-oligomerization of the mixed cyanate of a diphenol with an epoxy resin using mole ratios of epoxy groups to cyanate groups of about 1 to 10 to about 1 to 40 or more are disclosed for the process described. The oligomers, and unreacted diphenol, if any, are then epoxidized using methods well known in the art. The resultant epoxy resin compositions possess excellent thermal stability as well as enhanced mechanical properties.

Preparation of advanced epoxy resin compositions containing triazine groups or both triazine and oxazoline groups are taught by R. E. Hefner, Jr., in U.S. Pat. No. 4,506,063 issued Mar. 19, 1985. In the process disclosed therein, the respective triazine-containing or triazine-containing and oxazoline-containing hydroxyaromatic oligomers are reacted with an epoxy resin. The application discloses advanced epoxy resins as well as cured compositions thereof.

Preparation of hydroxyaromatic oligomers containing triazine groups and iminocarbamate linkages is taught by R. E. Hefner, Jr. in U.S. Pat. No. 4,555,553 issued Nov. 26, 1985. The process disclosed therein uses the aforementioned mixed cyanate of a diphenol or polyphenol. Co-oligomerization of this cyanate mixture with an aromatic polyamine, such as methylenedianiline, provides hydroxyaromatic oligomers containing both triazine groups and iminocarbamate linkages. Oligomers prepared from co-oligomerization of the mixed cyanate of a diphenol with an aromatic diamine using mole ratios of amino groups to cyanate groups of about 1 to 5 to about 1 to 40 or more are disclosed for the process described. The oligomers, and unreacted diphenol, if any, are then epoxidized using methods well known in the art. The oligomers, and unreacted diphenol, if any, are reacted with an epoxy resin using methods well known in the art to provide advanced epoxy resin compositions. The resultant epoxy resin and advanced epoxy resin compositions possess unusually high mechanical strength.

SUMMARY OF THE INVENTION

The present invention pertains to novel hydroxyaromatic oligomers prepared by
(I) reacting at a temperature and time sufficient to essentially complete the reaction of
  (A) at least one material having an average of more than one aromatic hydroxyl group per molecule with
  (B) at least 0.01 but not more than 0.95, preferably from about 0.05 to about 0.55 moles of at least one cyanogen halide per aromatic hydroxyl group in the presence of
  (C) from about 0.01 to about 1.1, preferably from about 0.05 to about 0.6 moles of a suitable base per aromatic hydroxyl group
  and thereafter recovering the resultant cyanate-containing mixture; and
(II) co-oligomerizing the product resulting from (I) with
  (D) a polymaleimide in an amount which provides a mole ratio of maleimide groups to cyanate groups of from about 0.01:1 to about 1:1, preferably from about 0.025:1 to about 0.1:1 optionally in the presence of
  (E) a suitable co-oligomerization catalyst and at a temperature and time to essentially complete the co-oligomerization reaction.

Another aspect of the present invention pertains to epoxy resin compositions prepared by reacting an epihalohydrin with the above prepared hydroxyaromatic oligomer composition and subseqently dehydrohalogenating the resultant halohydrin ether and thereafter recovering the resultant glycidyl ether product.

Another aspect of the present invention pertains to advanced epoxy resin compositions prepared by reacting
  (A) at least one hydroxyaromatic oligomer prepared from co-oligomerization reaction of a mixed cyanate of a polyphenol with a polymaleimide, and
  (B) at least one material having an average of more than 1,2-epoxy group per molecule;
wherein components (A) and (B) are employed in proportions which provide a ratio of hydroxyl groups to epoxy groups of from about 0.02:1 to about 1:1, preferably from about 0.1:1 to about 0.5:1.

Another aspect of the present invention pertains to the product resulting from curing the aforementioned epoxy resins or advanced epoxy resins with a curing quantity of a suitable curing agent and/or catalyst or mixture of curing agents and/or catalysts.

DETAILED DESCRIPTION OF THE INVENTION

Suitable materials having an average of more than one aromatic hydroxyl group per molecule which can be employed to prepare the cyanate mixture precursor to the co-oligomerization product of a mixed cyanate and a polymaleimide, include, for example, those represented by the formulas:

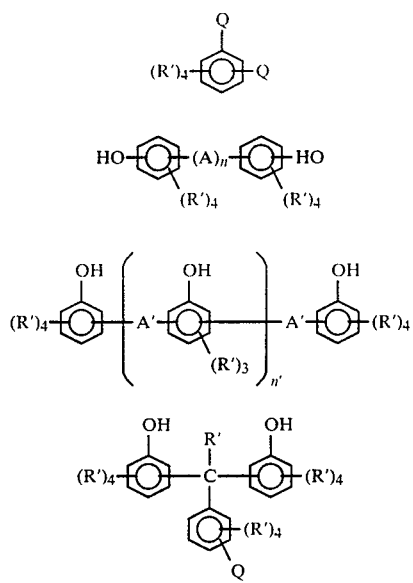

wherein each A is independently a divalent hydrocarbon group having from 1 to about 12, preferably from about 1 to about 6 carbon atoms,

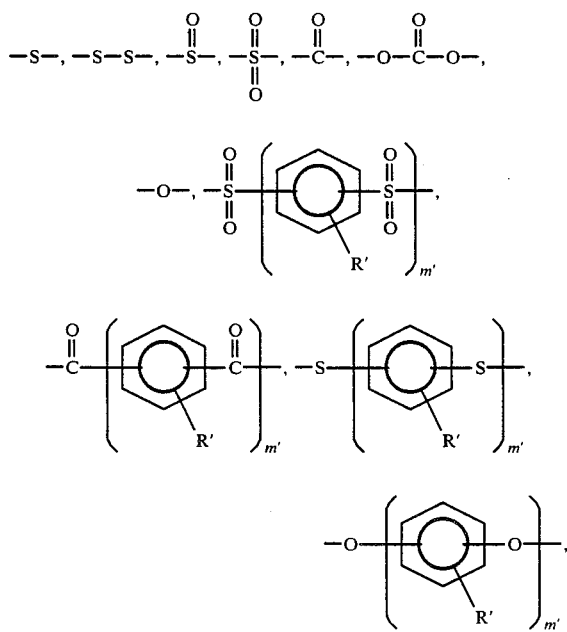

and the like; each A' is independently a divalent hydrocarbon group having from 1 to about 3, preferably 1, carbon atoms or a

group; each R' is independently hydrogen or a hydrocarbyl or hydrocarbyloxy group having from 1 to about 6 carbon atoms or a halogen, preferably chlorine or bromine; m' has a value from 1 to about 100, preferably from 1 to about 10; n has a value of zero or 1; n' has a value from about 0.001 to about 6; and p has a value of from zero to about 10, preferably from zero to 3.

Particularly suitable aromatic hydroxyl-containing compounds include, for example, o-, m- and p-dihydroxybenzene, 2-tert-butyl hydroquinone, 2,4-dimethyl resorcinol, 2,5-di-tert-butyl hydroquinone, tetramethyl hydroquinone, 2,4,6-trimethyl resorcinol, 4-chlororesorcinol, 4-tertbutyl pyrocatechol, 1,1-bis(4-hydroxyphenyl)ethane, 2,2-bis(4-hydroxyphenyl)propane, 2,2-bis(4-hydroxyphenyl)pentane, bis(4,4'-dihydroxyphenyl)methane, 4,4'-dihydroxydiphenyl, 2,2'-dihydroxydiphenyl, 3,3',5,5'-tetramethyl-4,4'-dihydroxydiphenyl, 3,3',5,5'-tetrachloro-4,4'-dihydroxydiphenyl, 3,3',5,5'-tetrachloro-2,2'-dihydroxydiphenyl, 2,2',6,6'-tetrachloro-4,4'-dihydroxydiphenyl, 4,4'-bis((3-hydroxy)phenoxy)diphenyl, 4,4'-bis((4-hydroxy)phenoxy)diphenyl, 2,2'-dihydroxy-1,1'-binaphthyl, and other dihydroxydiphenyls; 4,4'-dihydroxydiphenyl ether, 3,3',5,5'-tetramethyl-4,4'-dihydroxydiphenyl ether, 3,3',5,5'-tetrachloro-4,4'-dihydroxydiphenyl ether, 4,4'-bis(p-hydroxyphenoxy)diphenyl ether, 4,4'-bis-(phydroxyphenyl isopropyl)diphenyl ether, 4,4'-bis(p-hydroxyphenoxy)benzene, 4,4'-bis(p-hydroxyphenoxy)diphenyl ether, 4,4'-bis(4-(4-hydroxyphenoxy)phenyl sulfone)diphenyl ether, and other dihydroxydiphenyl ethers; 4,4'-dihydroxydiphenyl sulfone, 3,3',5,5'-tetramethyl-4,4'-dihydroxydiphenyl sulfone, 3,3', 5,5'-tetrachloro-4,4'-dihydroxydiphenyl sulfone, 4,4'-bis(p-hydroxyphenyl isopropyl)diphenyl sulfone, 4,4'-bis((4-hydroxy)phenoxy)diphenyl sulfone, 4,4'-bis((3-hydroxy)phenoxy)diphenyl sulfone, 4,4'-bis(4-(4-hydroxyphenyl isopropyl)phenoxy)diphenyl sulfone, 4,4'-bis(4-(4-hydroxy)diphenoxy)diphenyl sulfone, and other diphenyl sulfones; 4,4'-dihydroxydiphenyl methane, 4,4'-bis(p-hydroxyphenyl)diphenyl methane, 2,2'-bis(p-hydroxyphenyl)propane, 3,3',5,5'-tetramethyl-2,2'-bis(p-hydroxyphenyl)propane, 3,3',5,5'-tetrachloro-2,2'-bis(p-hydroxyphenyl)propane, 1,1,-bis(p-hydroxyphenyl)cyclohexane, bis-(2-hydroxy-1-naphthyl)methane, 1,2-bis(p-hydroxyphenyl)-1,1,2,2-tetramethyl ethane, 4,4'-dihydroxybenzophenone, 4,4'-bis(4-hydroxy)phenoxybenzophenone, 1,4-bis(p-hydroxyphenyl isopropyl)benzene, phloroglucinol, pyrogallol, 2,2',5,5'-tetrahydroxydiphenyl sulfone, other dihydroxyphenyl alkanes, tris(hydroxyphenyl)methane, tris(4-hydroxy-2-bromophenyl)methane, other tris(hydroxyphenyl)alkanes, mixtures thereof and the like.

Suitable cyanogen halides which can be employed to prepare the cyanate mixture precursor include, for example, cyanogen chloride, cyanogen bromide, mixtures thereof and the like.

If desired, the method reported in *Orgqnic Synthesis*, Vol. 61, pages 35–67 (1983), published by John Wiley & Sons, may be used to generate the required amount of cyanogen halide in situ, although this is less preferred than using neat cyanogen halide.

Suitable base materials which can be employed to prepare the cyanate mixture precursor include both inorganic bases and tertiary amines, such as, for example, sodium hydroxide, potassium hydroxide, triethylamine, pyridine, lutidine, mixtures thereof and the like. The tertiary amines are most preferred as the base material.

Suitable co-oligomerization catalysts which can optionally although most preferably be employed for co-oligomerization of the cyanate mixture and polymaleimide include, for example, metal salts of carboxylic acids, such as, for example, lead octoate, zinc stearate, zinc acetylacetonate, at concentrations of about 0.001 to 5 percent. Most preferred catalysts are cobalt naphthenate and cobalt octoate, mixtures thereof and the like.

Reaction to provide the cyanate mixture is usually conducted at a temperature of from about −40° C. to about 60° C., preferably from about −20° C. to about 25° C. for from about 10 minutes (600 s) to about 120 minutes (7200 s), preferably from about 10 minutes (600 s) to about 60 minutes (3600 s).

If desired, the reaction to provide the cyanate mixture can be conducted in the presence of an inert solvent reaction medium. Suitable such solvents include, for example, water, chlorinated hydrocarbons, ketones, mixtures thereof and the like. Most preferred solvents include acetone and methylene chloride.

Suitable polymaleimides which can be employed herein include, for example, those represented by the formulas

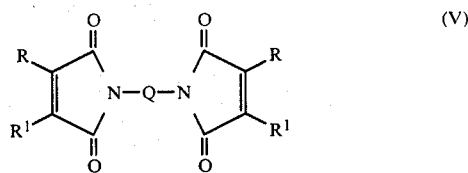
(V)

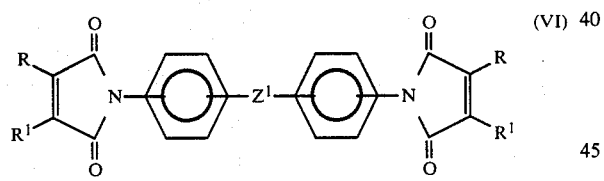
(VI)

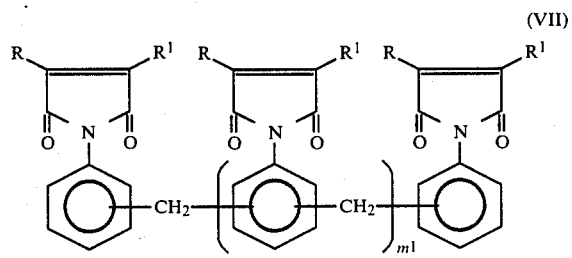
(VII)

wherein $Z^1$ is independently a direct bond, an alkylene group having from 1 to about 5 carbon atoms,

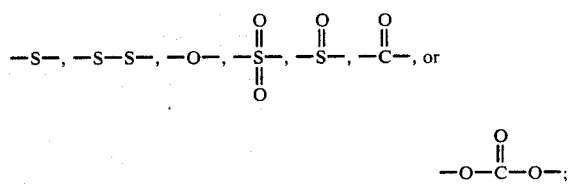

each R and $R^1$ is independently hydrogen or a hydrocarbyl group having from 1 to about 3 carbon atoms; Q is a divalent alkyl radical having 2 to about 12 carbon atoms and $m^1$ has a value of 0.01 to about 10.

Typical polymaleimides represented by formulas V, VI, and VII include, N,N′-ethylenebismaleimide, N,N′-ethylenebis(2-methylmaleimide), N,N′-hexamethylenemaleimide, N,N′-(oxydi-p-phenylene)bismaleimide, N,N′-(methylenedi-p-phenylene)bismaleimide, N,N′-(methylenedi-p-phenylene)bis(2-methylmaleimide), N,N′-(thiodi-p-phenylene)bismaleimide, N,N′-(sulfonyldi-m-phenylene)bismaleimide, N,N′-(isopropylidenedi-p-phenylene)bismaleimide, polymethylene polyphenylene polymaleimides and the like. The polymaleimides may be used either alone or in any combination.

The polymaleimides can be prepared by reacting a stochiometric quantity of a maleic anhydride per amine group of a polyamine in the presence of a suitable solvent.

Suitable maleic anhydrides include, for example, those represented by the formula

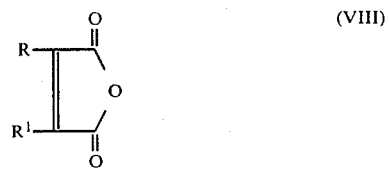
(VIII)

wherein R and $R^1$ are as hereinbefore defined.

Suitable maleic anhydrides include maleic anhydride, methyl maleic anhydride, mixtures thereof and the like. Most preferred as the maleic anhydride is maleic anhydride, per se.

Suitable polyamines which can be employed to prepare the polymaleimides include, for example, those represented by the formulas

(IX)

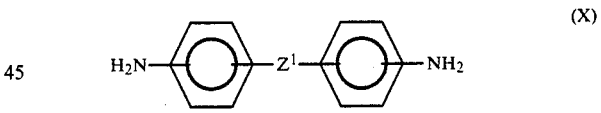
(X)

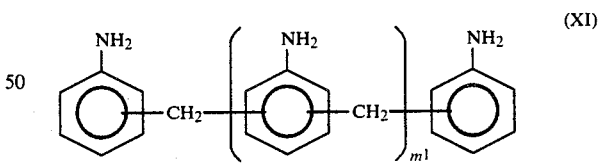
(XI)

wherein Q, $Z^1$ and $m^1$ are as hereinbefore defined.

Suitable polyamines include 1,4-diamino-butane, dodecyl diamine, 1,6-hexane diamine, 2-methyl-4-ethyl-1,8-diaminooctane, methylene dianiline, diamino-diphenyl ether, aniline-formaldehyde condensation products, mixtures thereof and the like.

Suitable solvents include aromatic hydrocarbons, chlorinated hydrocarbons, N,N-dimethylformamide and the like. Most preferred solvents are N,N-dimethylformamide, chloroform and toluene. The polymaleamic acid resulting from reaction of a maleic anhydride and a polyamine may be isolated then dehydrated to the desired polymaleimide. Alternately, the reaction may be performed in a single continuous step. Detailed procedure for preparing polymaleimides can be found in U.S. Pat. No. 2,462,835 and 2,444,536.

The co-oligomerization reaction is usually conducted at a temperature of from about 70° C. to about 250° C., preferably from about 70° C. to about 200° C. for a period of from about 30 minutes (1800 s) to about 240 minutes (14,400 s), preferably from about 60 minutes (3600 s) to about 120 minutes (7200 s). The co-oligomerization reaction is preferably performed in the presence of the aforementioned catalyst(s).

The cyanate mixture and polymaleimide are thoroughly blended to provide a homogeneous mixture prior to co-oligomerization reaction. This is accomplished either by grinding or blending the solid cyanate mixture and polymaleimide or, preferably, by dispersing or dissolving or slurring said polymaleimide in a molten solution of cyanate mixture.

Co-oligomerization of the cyanate mixture with a polymaleimide can lead to a complex variety of structures including the cyanate group homopolymerization structure (triazine)

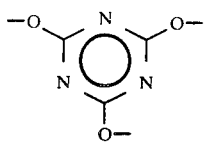

the maleimide group homopolymerization structure

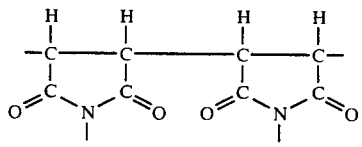

and cyanate group and maleimide group copolymerization structures such as, for example,

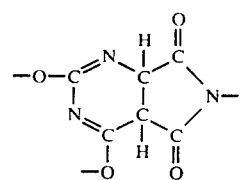

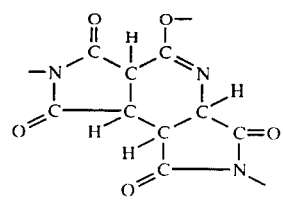

The terms homopolymerization and copolymerization are also meant to include both dimerization and oligomerization. Minor amounts of other co-oligomerization structures may also be formed, such as, for example, the phenolic hydroxyl addition product to the maleimide unsaturation:

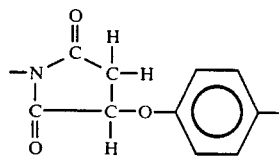

Epoxidation of the co-oligomerization product can be performed by the known methods described in *Handbook of Epoxy Resins* by Lee and Neville, McGraw-Hill, (1967) which is incorporated herein by reference. This usually includes reacting the co-oligomerization product (step II) with an epihalohydrin followed by dehydrohalogenation with a basic-acting material such as an alkali metal hydroxide and finally recovering the resultant glycidyl ether product.

Suitable epoxy resins for advancement reaction with the co-oligomerization product of a mixed cyanate and a polymaleimide include, for example, those represented by the formulas:

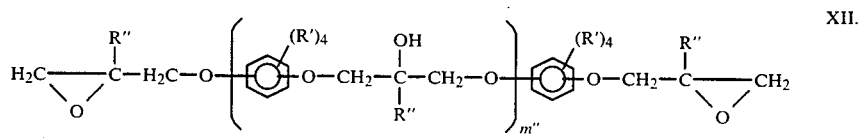

XII.

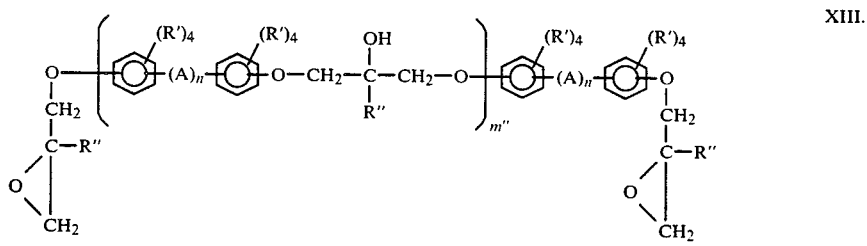

XIII.

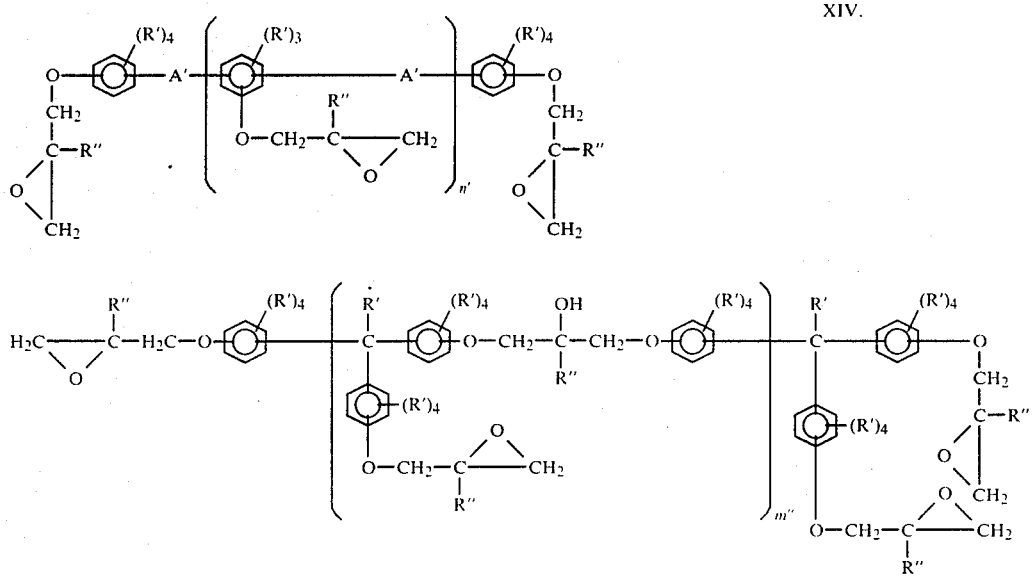

XIV.

wherein A, A', R', n and n' are as herein before defined, each R" is independently hydrogen or a hydrocarbyl group having from 1 to about 3 carbon atoms, and m" has a value from zero to about 40, preferably from 0.1 to about 5.

The advancement reaction is optionally, although preferably, performed in the presence of 0.01 to about 2.0 percent by weight of a suitable catalyst. Suitable catalysts include bases, basic acting materials, acids and the like. Preferred catalysts are the quaternary ammonium salts and phosphonium salts. A most preferred catalyst is benzyltrimethylammonium chloride. Reaction times and temperatures vary depending on the composition of the epoxy resin reactant used; the amount and type of catalyst used, if any; the presence of inert solvent, if any. Typically, the advancement reaction when catalyzed is conducted at a temperature of from about 50° C. to about 200° C., preferably from about 90° C. to about 120° C. for from about 15 minutes (900 s) to about 240 minutes (14400 s), preferaby from about 30 minutes (1800 s) to about 90 minutes (5400 s). Advancement reaction times and temperatures are generally longer and higher, respectively, for the non-catalyzed reaction.

Suitable curing agents and/or catalysts for curing and/or preparing epoxy resins and advanced epoxy resins are described in the *Handbook of Epoxy Resins* by Lee and Neville, McGraw-Hill, (1967), as well as U.S. Pat. Nos. 3,477,990; 3,948,855; and 4,366,295 which are incorporated herein by reference.

The epoxy resins and advanced epoxy resins of the present invention can be used to prepare castings, coatings, laminates, composites, encapsulations and the like, and are especially suited for use in applications requiring high mechanical strength. If desired, solvent, fillers, pigments, flow control agents, dyes, fire suppressants and other additives can be employed.

In the preparation of laminates or composites from the compositions of the present invention, suitable substrates include, but are not limited to, woven and nonwoven fibers and/or filaments of glass, carbon, graphite, boron, aramid, asbestos, glass and carbon hybrids, combinations thereof and the like.

The following examples are illustrative of the invention, but are not to be construed as to limiting the scope thereof in any manner.

EXAMPLE 1

A. Preparation of Diphenol Cyanate Mixture

Cyanogen bromide (1.10 moles, 116.52 grams) was added to a reactor containing a stirred solution of bisphenol A (2.00 moles, 456.6 grams) in acetone (1000 milliliters) cooled to −5° C. under a nitrogen atmosphere. The stirred solution was allowed to equilibrate at −5° C. Triethylamine (1.00 moles, 101.20 grams) was then added to the reactor over a 14 minute (840 s) period so as to maintain the reaction temperature at −5° to −2° C. After completion of the triethylamine addition, the reactor was maintained at −5° to −3° C. for an additional 30 minutes (1800 s), followed by addition of the reaction product to chilled water (1.5 gallons, 5.7 liters) with agitation. After 5 minutes (300 s), the water and product mixture was subjected to multiple extractions with three 500 milliliter portions of methylene chloride. The combined methylene chloride extracts were sequentially washed with two 750 milliliter portions of water and then dried over anhydrous sodium sulfate. The dry methylene chloride extract was filtered and solvent removed by rotary evaporation under vacuum. The diphenol cyanate mixture was recovered (464.4 grams) as a light yellow colored solid at room temperature (25° C.). Infrared spectrophotometric analysis demonstrated the presence of the cyanate groups as well as unreacted hydroxyl groups. Liquid chromatographic analysis demonstrated the presence of 56.88 area percent bisphenol A, 36.94 area percent bisphenol A monocyanate, and 6.18 area percent bisphenol A dicyanate.

B. Preparation of Bismaleimide of Methylenedianiline

A 106.0 gram portion of maleic anhydride (1.08 moles) and 400 milliliters of N,N-dimethylformamide were added to a reactor and maintained under a nitrogen atmosphere with stirring. The stirred solution was cooled to 5° C. then 107.0 grams of methylenedianiline (0.54 mole) dissolved in 200 milliliters of N,N-dimethylformamide was added to the reactor over a sixty minute (3600 s) period and so as to maintain the reaction temperature at 5° to 10° C. After completion of the methylenedianiline in N,N-dimethylformamide solution addition the reactor was maintained at 5° to 10° C. for an additional 120 minutes (7200 s). The reactor was then allowed to warm to room temperature (25° C.), and the reaction product was removed and rotary evaporated at 55° to 60° C. under vacuum. After approximately 300 milliliters of N,N-dimethylformamide and water had distilled off, a voluminous light yellow colored precipitate formed and was recovered by filtration. The recovered precipitate was recrystallized from acetone and then dried in a vacuum oven at 80° C. The bismaleimide of methylenedianiline (172.6 grams) was recovered in 89.2 percent yield as a light yellow colored powder. Infrared spectrophotometric analysis of a potassium chloride pellet of the product confirmed the product structure. Nuclear magnetic resonance spectroscopy provided further confirmation of the product structure.

C. Co-oligomerization of Diphenol Cyanate Mixture and Bismaleimide

A portion of the diphenol cyanate mixture (191.5 grams) from A above was added to a reactor and heated to 100° C. with stirring under a nitrogen atmosphere. A portion of the bismaleimide of methylenedianiline (6.53 grams) from B above was added to the stirred diphenol cyanate mixture. After 5 minutes (300 s) of mixing, 6.0 percent cobalt naphthenate (0.10 percent by weight, 0.207 gram) was added to the stirred diphenol cyanate and bismaleimide mixture. The reaction temperature was increased to 177° C. and maintained for 1.5 hours (5400 s). The hydroxyaromatic co-oligomerization product was recovered in quantitative yield as a light amber colored, brittle, transparent solid at room temperature (23° C.). Infrared spectrophotometric analysis of a film sample of the co-oligomerization product demonstrated complete disappearance of the cyanate functionality (2279 and 2238 $cm^{-1}$), appearance of aromatic ring carbon-nitrogen and carbon-carbon absorbances (1614, 1598, 1565 and 1507 $cm^{-1}$), appearance of maleimide carbonyl functionality (1696 $cm^{-1}$) and presence of hydroxyl functionality (3370 $cm^{-1}$).

EXAMPLE 2

A. Epoxy Resin Advancement with Diphenol Cyanate Mixture and Bismaleimide Co-oligomerization Product A portion (59.61 grams, 0.3713 hydroxyl equivalent) of the diphenol cyanate mixture and bismaleimide co-oligomerization product from Example 1-C, a diglycidyl ether of bisphenol A (400.0 grams, 2.2279 equivalents) having an epoxide equivalent weight (EEW) of 179.54 and 60 percent aqueous benzyltrimethylammonium chloride (0.460 gram) catalyst were added to a reactor and heated to 120° C. with stirring under a nitrogen atmosphere. After 60 minutes (3600 s) at the 120° C. reaction temperature, the reactor was cooled and the epoxy resin advanced with diphenol cyanate mixture and bismaleimide co-oligomerization product was recovered as a transparent, amber colored liquid. Epoxide titration revealed the resin to contain 16.03 percent epoxide (268.3 EEW). Infrared spectrophotometric analysis of a film sample of the advanced epoxy resin demonstrated the presence of aromatic ring carbon-nitrogen and carbon-carbon absorbances (1606, 1581 and 1516 $cm^{-1}$), presence of hydroxyl functionality (3493 $cm^{-1}$), presence of epoxide functionality (835 $cm^{-1}$) and presence of two minor absorbances of 1713 and 1754 $cm^{-1}$.

B. Preparation of Cured Advanced Epoxy Resin

A portion of the advanced epoxy resin of Example 2-A (200.0 grams) was heated to 100° C., then 4,4'-diaminodiphenyl methane (36.91 grams) was added and thoroughly mixed in. This solution was used to prepare a clear, unfilled one-eighth inch (0.3175 cm) casting for heat distortion temperature (264 psi, 1820 kPa), tensile and flexural strength, flexural modulus, percent elongation and average Barcol hardness (934-1 scale) determinations. The casting was cured for 2 hours (7200 s) at 100° C., followed by post-curing for 2 hours (7200 s) at 125° C. then 2 hours (7200 s) at 177° C. Mechanical properties of tensile (8) and flexural (5) test pieces were determined using an Instron machine with standard test methods (ASTM D-638 and D-790). Heat distortion temperature of clear casting test pieces (2) was determined using an Aminco Plastic Deflection Tester (American Instrument Co.) with standard test methods (ASTM D-648 modified by use of ⅛ inch (3.175 mm) thick test pieces). The results are reported in Table I.

COMPARATIVE EXPERIMENT A (Example 2 of U.S. 4,506,063)

1. Preparation of Diphenol Cyanate Mixture

Cyanogen bromide (0.55 moles, 58.26 grams) was added to a reactor containing stirred acetone (175 milliliters) under a nitrogen atmosphere. The cyanogen bromide-acetone solution was cooled to −5° C., then bisphenol A (1.00 mole, 228.30 grams) dissolved in chilled acetone (650 milliliters) was added to the reactor. The stirred solution was allowed to equilibrate at −5° C., then triethylamine (0.50 mole, 50.60 grams) was added to the reactor over a 25 minute (1500 s) period and so as to maintain the reaction temperature at −2° to −5° C. After completion of the triethylamine addition, the reactor was maintained at −2° to 0° C. for an additional 20 minutes (1200 s), followed by addition of the reaction product to chilled water (1 gallon, 3078 ml) with agitation. After 15 minutes (900 s), the water and product mixture was subjected to multiple extractions with methylene chloride. The combined methylene chloride extracts were sequentially washed with dilute hydrochloric acid (5 percent), water, hydrochloric acid, water and then dried over anhydrous magnesium sulfate. The dry methylene chloride extract was filtered and solvent removed by rotary evaporation under vacuum. The diphenol cyanate mixture was recovered (229.7 grams) as a white-colored solid at room temperature (25° C.). Infrared spectrophotometric analysis demonstrated the presence of the cyanate functionality as well as unreacted hydroxyl functionality. Liquid chromatographic analysis demonstrated the presence of 55.82 area percent bisphenol A, 37.89 area percent bisphenol A monocyanate, and 6.29 area percent bisphenol A dicyanate.

2. Trimerization of Diphenol Cyanate Mixture

The diphenol cyanate mixture (229.7 grams) from 1 above and 6.0 percent cobalt naphthenate (0.10 percent by weight, 0.23 gram) were thoroughly mixed and placed in a glass tray. The tray was then placed in a forced-air, convection-type oven and maintained for 1.25 hours (4500 s) at 177° C. The hydroxyaromatic oligomers containing triazine groups were recovered in quantitative yield as a transparent, brittle solid at room temperature (25° C.). The oligomers had a greenish-colored cast due to the catalyst. At the 177° C. temperature, the oligomers were still totally fluid. Infrared spectrophotometric analysis demonstrated complete disappearance of the cyanate functionality, appearance of the triazine functionality, and the presence of unreacted hydroxyl functionality.

3. Epoxy Resin Advancement with Hydroxyaromatic Oligomers Containing Triazine Groups A portion (31.84 grams, 0.20 mole hydroxyl) equivalent) of hydroxyaromatic oligomers containing triazine groups prepared using the method of Comparative Experiment A-2, a diglycidyl ether of bisphenol A (219.60 grams, 1.20 equivalent) having an EEW of 183 and 60 percent aqueous benzyltrimethylammonium chloride (0.251 gram) catalyst were added to a reactor and heated to 120° C. with stirring under a nitrogen atmosphere. After 60 minutes (3600 s) at the 120° C. reaction temperature, the reactor was cooled and the epoxy resin advanced with triazine functional oligomers was recovered as a transparent yellow colored liquid. Epoxide titration revealed 15.38 percent epoxide in the resin.

4. Curing of Epoxy Resin Advanced with Hydroxyaromatic Triazine Functional Oligomers A portion of the epoxy resin from 3 above (241.13 grams) was heated to 100° C., then 4,4'-diaminodiphenyl methane (41.45 grams) was added and thoroughly mixed in. This solution was used to prepare a clear, unfilled one-eighth inch (0.3175 cm) casting using the method of Example 2. Mechanical properties were evaluated using the method of Example 2. The results are reported in Table I.

COMPARATIVE EXPERIMENT B (Example 4 of U.S. Pat. No. 4,506,063)

1. Preparation of Diphenol Cyanate Mixture

Cyanogen bromide (0.55 moles, 58.26 grams) was added to a reactor containing stirred acetone (175 milliliters) under a nitrogen atmosphere. The cyanogen bromide-acetone solution was cooled to −3° C., then bisphenol A (1.00 mole, 228.30 grams) dissolved in chilled acetone (650 milliliters) was added to the reactor. The stirred solution was allowed to equilibrate at −3° C., then triethylamine (0.50 mole, 50.60 grams) was added to the reactor over a thirty minute (1800 s) period so as to maintain the reaction temperature at −5° to 0° C. After completion of the triethylamine addition, the reactor was maintained at 0° to 7° C. for an additional 20 minutes (1200 s), followed by addition of the reaction product to chilled water (1 gallon, 3078 ml) with agitation. After 15 minutes (900 s), the water and product mixture was multiply extracted with methylene chloride (400 milliliters total). The combined methylene chloride extracts were washed 5 percent hydrochloric acid (500 milliliters), then water (800 milliliters), and then dried over anhydrous sodium sulfate. The dry methylene chloride extract was filtered and solvent removed by rotary evaporation under vacuum. The diphenol cyanate mixture was recovered (234.12 grams) as a white-colored solid at room temperature (25° C.). Infrared spectrophotometric analysis demonstrated the presence of the cyanate functionality as well as unreacted hydroxyl functionality. Liquid chromatographic analysis demonstrated the presence of 67.2 area percent bisphenol A, 29.9 area percent bisphenol A monocyanate, and 2.9 area percent bisphenol A dicyanate.

2. Co-oligomerization of Diphenol Cyanate Mixture and an Epoxy Resin

A portion of the diphenol cyanate mixture (230.3 grams) from 1 above, an epoxy resin (10.79 grams) and 6.0 percent cobalt naphthenate (0.10 percent by weight, 0.24 gram) were thoroughly mixed and placed in a glass tray. The epoxy resin had an epoxide equivalent weight (EEW) of 337.8 and was prepared by reaction of bisphenol A diglycidyl ether, EEW=183, (0.40 mole, 146.4 grams) with bisphenol A (0.20 mole, 45.66 grams) and benzyl trimethylammonium chloride catalyst 60 percent aqueous, (0.19 gram) at 120° C. for 50 minutes (3000 s). The tray was then placed in a forced-air, convection-type oven and maintained for 1.25 hours (4500 s) at 177° C. The hydroxyaromatic co-oligomerization product containing triazine and oxazoline groups was recovered in quantitative yield as a transparent, light amber-colored, brittle solid at room temperature (25° C.). Infrared spectrophotometric analysis demonstrated complete disappearance of the cyanate functionality, appearance of the triazine functionality, appearance of the oxazoline functionality and the presence of unreacted hydroxyl functionality.

3. Epoxy Resin Advancement with Hydroxyaromatic Oligomers Containing Triazine and Oxazoline Groups A portion (33.24 grams, 0.20 mole hydroxyl equivalent) of hydroxyaromatic oligomers containing triazine and oxazoline groups prepared using the method of Comparative Experiment B-2, a diglycidyl ether of bisphenol A (219.60 grams, 1.20 equivalent) having an EEW of 183 and 60 percent aqueous benzyltrimethylammonium chloride (0.253 gram) catalyst were added to a reactor and heated to 120° C. with stirring under a nitrogen atmosphere. After 60 minutes (3600 s) at the 120° C. reaction temperature, the reactor was cooled and the epoxy resin advanced with triazine and oxazoline functional oligomers was recovered as a transparent, yellow colored liquid. Epoxide titration revealed 15.32 percent epoxide in the resin.

4. Curing of Epoxy Resin Advanced with Hydroxyaromatic Triazine and Oxazoline Functional Oligomers A portion of the epoxy resin from 3 above (238.64 grams) was heated to 100° C., then 4,4'-diaminodiphenyl methane (42.09 grams) was added and thoroughly mixed in. This solution was used to prepare a clear, unfilled one-eighth inch (0.3175 cm) casting using the method of Example 2. Mechanical properties were evaluated using the method of Example 2. The results are reported in Table I.

COMPARATIVE EXPERIMENT C (Example 4 of U.S. Pat. No. 4,555,553)

1. Preparation of Diphenol Cyanate Mixture

Cyanogen bromide (1.65 moles, 174.79 grams) was added to a reactor containing a stirred solution of bisphenol A (3.00 moles, 684.9 grams) in acetone (1200 milliliters) cooled to −5° C. under a nitrogen atmosphere. The stirred solution was allowed to equilibrate at −5° C. Triethylamine (1.50 moles, 151.80 grams) was then added to the reactor over a 24 minute (1440 s) period so as to maintain the reaction temperature at −5° to −2° C. After completion of the triethylamine addition, the reactor was maintained at −5° to −2° C. for an additional 30 minutes (1800 s), followed by addition of the reaction product to chilled water (1.5 gallons, 5.7 liters) with agitation. After 5 minutes (300 s), the water and product mixture was subjected to multiple extractions with three 500 milliliter portions of methylene chloride. The combined methylene chloride extracts were sequentially washed with 500 milliliters of dilute 1% aqueous hydrochloric acid, 800 milliliters of water and then dried over anhydrous sodium sulfate. The dry methylene chloride extract was filtered and solvent removed by rotary evaporation under vacuum. The diphenol cyanate mixture was recovered (705.0 grams) as a light yellow colored solid at room temperature (25° C.). Infrared spectrophotometric analysis demonstrated the presence of the cyanate groups as well as unreacted hydroxyl groups. Liquid chromatographic analysis demonstrated the presence of 56.24 area percent bisphenol A, 38.55 area percent bisphenol A monocyanate, and 5.21 area percent bisphenol A dicyanate.

chloride (0.498 gram) catalyst were added to a reactor and heated to 120° C. with stirring under a nitrogen atmosphere. After 60 minutes (3600 s) at the 120° C. reaction temperature, the reactor was cooled and the epoxy resin advanced with oligomers containing triazine groups and imino carbamate linkages was recovered as a transparent, light yellow colored liquid. Epoxide titration revealed the resin to contain 16.70 percent epoxide (257.5 EEW).

4. Curing of Epoxy Resin Advanced with Hydroxyaromatic Oligomers Containing Triazine Groups and Iminocarbamate Linkages A portion of the epoxy resin from 3 above (230.0 grams) was heated to 100° C., then 4,4′-diaminodiphenyl methane (44.22 grams) was added and thoroughly mixed in. This solution was used to prepare a clear, unfilled one-eighth inch (0.3175 cm) casting using the method of Example 2. Mechanical properties were evaluated using the method of Example 2. The results are reported in Table I.

TABLE I

|  | EXAMPLE 2 | COMPARATIVE EXPERIMENT A | COMPARATIVE EXPERIMENT B | COMPARATIVE EXPERIMENT C |
|---|---|---|---|---|
| Barcol Hardness | 34 | 38 | 40 | 32 |
| Heat Distortion Temperature, °F./°C. | 305.6/152 | 297.5/147.5 | 294.8/146 | 288.5/142.5 |
| Tensile Strength, psi | 12,041 | 11,829 | 10,498 | 11,776 |
| , kPa | 83,020 | 81,559 | 72,382 | 81,193 |
| Elongation % | 9.63 | 5.69 | 4.30 | 8.22 |
| Flexural Strength, psi | 19,759 | 21,415 | 21,680 | 19,352 |
| , kPa | 136,234 | 147,652 | 149,479 | 133,428 |
| Flexural Modulus, psi | 439,861 | 421,000 | 409,000 | 394,000 |
| , kPa | 3,032,754 | 2,902,711 | 2,819,973 | 2,716,551 |

2. Co-oligomerization of Diphenol Cyanate Mixture and and Aromatic Diamine

A portion of the diphenol cyanate mixture (500.0 grams) from 1 above, 4,4′-diaminodiphenyl methane (9.40 grams) and methylene chloride solvent (400.0 grams) were mixed on a shaker until a homogeneous mixture was obtained. The mixture was thoroughly blended with 6.0 percent cobalt naphthenate (0.10 percent by weight, 0.51 gram) then placed in a glass tray. The tray was then placed in a vacuum oven and methylene chloride solvent devolatilized from the mixture. The devolatilized mixture was then placed in a forced-air, convection-type oven and maintained for 2.0 hours (7200 s) at 177° C. The hydroxyaromatic co-oligomerization product containing triazine groups and imino carbamate linkages was recovered in quantitative yield as a transparent, light yellow-colored, brittle solid at room temperature (25° C.). Infrared spectrophotometric analysis demonstrated complete disappearance of the cyanate functionality, appearance of the triazine functionality, appearance of absorption attributed to the imino carbamate functionality and the presence of unreacted hydroxyl functionality.

3. Eposy Resin Advancement with Hydroxyaromatic Oligomers Containing Triazine Groups and Imino Carbamate Linkages A portion (62.02 grams, 0.40 hydroxyl equivalent) of hydroxyaromatic oligomers containing triazine groups and imino carbamate linkages from 2 above, a diglycidyl ether of bisphenol A (435.67 grams, 2.40 equivalent) having an epoxide equivalent weight (EEW) of 181.5 and 60 percent aqueous benzyltrimethylammonium

EXAMPLE 3

A. Epoxidation of Diphenol Cyanate Mixture and Bismaleimide Co-oligomerization Product A portion (200.0 grams, 1.246 hydroxyl equivalent) of a diphenol cyanate mixture and bismaleimide co-oligomerization product prepared using the method of Example 1-C, epichlorohydrin (6.4413 moles, 596.0 grams), isopropanol (320.9 grams, 35 percent by weight of epichlorohydrin used) and water (51.8 grams, 8 percent by weight of epichlorohydrin used) were added to a reactor and stirred under a nitrogen atmosphere at 50° C. until a solution was formed. At that time, dropwise addition of a sodium hydroxide (2.319 moles, 92.76 grams) solution in water (371.0 grams) commenced and was completed over the next 45 minutes (2700 s). During this sodium hydroxide addition, the reaction temperature was allowed to increase to 60° C. and was then held at this temperature. Fifteen minutes (900 s) after the addition of sodium hydroxide solution, a second solution of sodium hydroxide (1.031 mole, 41.2 grams) in water (164.9 grams) was added dropwise to the reactor over the next 20 minutes (1200 s). Fifteen minutes (900 s) later, the reactor was cooled to 40° C., then an initial water wash (400 milliliters) was added to the reactor. An insoluble amber colored precipitate was recovered by decantation of the reactor contents into a separatory funnel. The water wash layer was separated and discarded while the organic layer was added back into the separatory funnel along with a second water wash (600 milliliters). The organic layer was separated then added back into the separatory funnel along with a third water wash (800 milliliters) and additional epichlorohydrin (200 milliliters). The recovered organic layer was stripped of solvents by rotary evaporation at 100° C. for 60 minutes (3600 s) under vacuum. The insoluble precipitate was dried under vacuum at 75° C. for 15 hours (54,000 s) and provided 14.2 grams of a light amber colored solid. The epoxy resin was recovered (262.7 grams) as a transparent yellow colored liquid at room temperature (25° C.). Epoxide titration revealed the presence of 20.72 percent by weight epoxide. Infrared spectrophotometric analysis of a film sample of the epoxy resin demonstrated the presence of aromatic ring carbon-nitrogen and carbon-carbon absorbances (1606, 1581 and 1516 cm$^{-1}$), presence of minor hydroxyl absorbance (3476 cm$^{-1}$), presence of epoxide functionality (835 cm$^{-1}$), presence of maleimide carbonyl absorbance as a shoulder (1696 cm$^{-1}$) and presence of two minor absorbances at 1713 and 1762 cm$^{-1}$.

B. Preparation of Cured Epoxy Resin

A portion of the epoxy resin of Example 3-A (225.0 grams) was heated to 100° C., then 4,4'-diaminodiphenyl methane (53.67 grams) was added and thoroughly mixed in. This solution was used to prepare a clear, unfilled one-eighth inch (0.3175 cm) casting using the method of Example 2-B. Mechanical properties of test pieces prepared from the casting were determined using the method of Example 2-B. The results are reported in Table II.

TABLE II

| Barcol Hardness | 37 |
| Heat Distortion Temperature, °F./°C. | 303.4/151 |
| Tensile Strength, | |
| psi | 12,941 |
| kPa | 89,226 |
| Elongation, % | 9.48 |
| Flexural Strength, | |
| psi | 22,478 |
| kPa | 154,981 |
| Flexural Modulus, | |
| psi | 456,463 |
| kPa | 3,147,221 |

I claim:

1. An advanced epoxy resin composition prepared by reacting
   (I) at least one hydroxyaromatic oligomer resulting from
      (A) reacting at a temperature and time sufficient to essentially complete the reaction of
         (1) at least one material having an average of more than one aromatic hydroxyl group per molecule with
         (2) at least 0.01 but not more than 0.95 mole of at least one cyanogen halide per aromatic hydroxyl group; in the presence of
         (3) from about 0.01 to about 1.1 moles of a suitable base per aromatic hydroxyl group contained in component (1); and thereafter recovering the resultant cyanate-containing mixture; and
      (B) co-oligomerizing at a temperature and a time sufficient to essentially complete the co-oligomerization reaction, the cyanate-containing product from (A) with
         (4) a polymaleimide in an amount which+provides a mole ratio of maleimide groups to cyanate groups of from about 0.01:1 to about 1:1; in the absence or presence of
         (5) a suitable co-oligomerization catalyst; with
   (II) at least one material having an average of more than one 1,2-epoxy group per molecule; wherein components (I) and (II) are employed in proportions which provide a ratio of hydroxyl groups to epoxy groups of from about 0.02:1 to about 1:1.

2. An advanced epoxy resin of claim 1 wherein
   (i) component (II) is a material represented by the formula

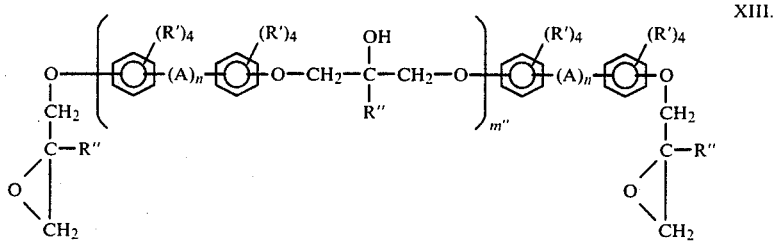

XIII.

wherein each A is independently a divalent hydrocarbon group having from 1 to about 12 carbon atoms,

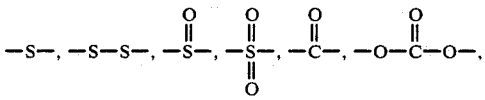

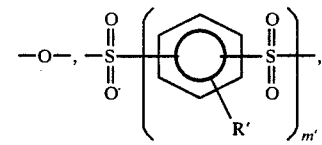

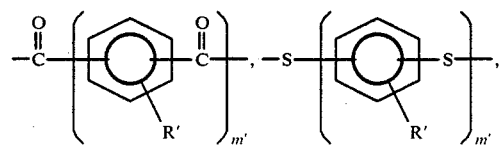

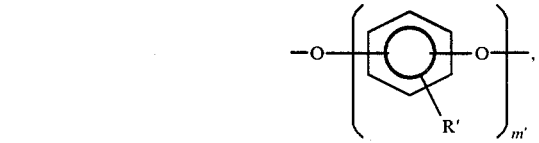

and the like; each R' is independently hydrogen or a hydrocarbyl or hydrocarbyloxy group having from 1 to about 6 carbon atoms or a halogen; each R" is independently hydrogen or a hydrocarbyl group having from 1 to about 3 carbon atoms; m"

has a value from zero to about 40 and n has a value of zero or 1; and (ii) components (I) and (II) are present in quantities which provide a ratio of hydroxyl groups to epoxy groups of from about 0.1:1 to about 0.5:1.

3. An advanced epoxy resin of claim 2 wherein in component (II) A is an isopropylidene group; R" is hydrogen; m" has a value of from about 0.1 to about 5; and n has a value of 1.

4. An advanced epoxy resin composition of claim 1 wherein (i) Component (A-1) is one or more materials represented by the following formula II $$HO-\underset{(R')_4}{\underset{|}{\bigcirc}}-(A)_n-\underset{(R')_4}{\underset{|}{\bigcirc}}-HO \qquad \text{II.}$$

wherein each A is independently a divalent hydrocarbon group having from 1 to about 12, carbon atoms, $$-S-,\ -S-S-,\ -\underset{O}{\overset{O}{\underset{\|}{S}}}-,\ -\underset{O}{\overset{O}{\underset{\|}{S}}}-,\ -\overset{O}{\underset{\|}{C}}-,\ -O-\overset{O}{\underset{\|}{C}}-O-,$$

$$-O-,\ -\underset{O}{\overset{O}{\underset{\|}{S}}}-\left(\underset{R'}{\bigcirc}\right)_{m'}-\underset{O}{\overset{O}{\underset{\|}{S}}}-,$$

$$-\overset{O}{\underset{\|}{C}}-\left(\underset{R'}{\bigcirc}\right)_{m'}-\overset{O}{\underset{\|}{C}}-,\ -S-\left(\underset{R'}{\bigcirc}\right)_{m'}-S-,$$

$$-O-\left(\underset{R'}{\bigcirc}\right)_{m'}-O-,$$

and the like; each R' is independently hydrogen or a hydrocarbyl or hydrocarbyloxy group having from 1 to about 6 carbon atoms or a halogen; m' has a value from 1 to about 100; and n has a value of zero or 1;

(ii) component (A-3) is a tertiary amine;

(iii) component (A-4) is a polymaleimide prepared by reacting maleic anhydride with an aromatic polyamine;

(iv) components (A-1) and (a-2) are present in quantities which provide a ratio of moles of cyanogen halide per aromatic hydroxyl group of from about 0.05:1 to about 0.55:1;

(v) component (A-3) is present in a quantity which provides a ratio of moles of component (a-3) to aromatic hydroxyl groups present in component (A-1) of from about 0.05:1 to about 0.6:1;

(vi) component (A-4) is present in a quantity which provides a mole ratio of maleimide groups to cyanate groups of from about 0.025:1 to about 0.1:1; and (vii) components (I) and (II) are employed in proportions which provide a ratio of hydroxyl groups to epoxy groups of from about 0.02:1 to about 1:1.

5. An advanced epoxy resin of claim 4 wherein (i) component (II) is a material represented by the formula $$\left(\underset{\underset{\underset{CH_2}{\overset{|}{C}-R''}}{\overset{|}{\underset{|}{CH_2}}}}{\overset{O}{\underset{|}{-}}}-\underset{(R')_4}{\bigcirc}-(A)_n-\underset{(R')_4}{\bigcirc}-O-CH_2-\underset{\underset{R''}{\overset{|}{-}}}{\overset{OH}{\underset{|}{C}}}-CH_2-O\right)_{m''}-\underset{(R')_4}{\bigcirc}-(A)_n-\underset{(R')_4}{\bigcirc}-\underset{\underset{CH_2}{\overset{|}{\underset{|}{C}-R''}}}{\overset{O}{\underset{|}{-}}} \qquad \text{XIII.}$$

wherein each A is independently a divalent hydrocarbon group having from 1 to about 12, carbon atoms, $$-S-,\ -S-S-,\ -\underset{O}{\overset{O}{\underset{\|}{S}}}-,\ -\underset{O}{\overset{O}{\underset{\|}{S}}}-,\ -\overset{O}{\underset{\|}{C}}-,\ -O-\overset{O}{\underset{\|}{C}}-O-,$$

$$-O-,\ -\underset{O}{\overset{O}{\underset{\|}{S}}}-\left(\underset{R'}{\bigcirc}\right)_{m'}-\underset{O}{\overset{O}{\underset{\|}{S}}}-,$$

$$-\overset{O}{\underset{\|}{C}}-\left(\underset{R'}{\bigcirc}\right)_{m'}-\overset{O}{\underset{\|}{C}}-,\ -S-\left(\underset{R'}{\bigcirc}\right)_{m'}-S-,$$

$$-O-\left(\underset{R'}{\bigcirc}\right)_{m'}-O-,$$

and the like; each R' is independently hydrogen or a hydrocarbyl or hydrocarbyloxy group having from 1 to about 6 carbon atoms or a halogen; each R" is independently hydrogen or a hydrocarbyl group having from 1 to about 3 carbon atoms; m"

has a value from zero to about 40 and n has a value of zero or 1; and (ii) components (I) and (II) are present in quantities which provide a ratio of hydroxyl groups to epoxy groups of from about 0.1:1 to about 0.5:1.

6. An advanced epoxy resin of claim 5 wherein in component (II) A is an isopropylidene group; R" is hydrogen; m" has a value of from about 0.1 to about 5; and n has a value of 1.

7. An advanced epoxy resin composition of claim 1 wherein
(i) component (A-1) is bisphenol A;
(ii) component (A-2) is cyanogen bromide;
(iii) component (A-4) is polymaleimide prepared by reacting maleic anhydride with methylenedianiline; and
(iv) components (I) and (II) are employed in proportions which provide a ratio of hydroxyl groups to epoxy groups of from about 0.02:1 to about 1:1.

8. An advanced epoxy resin of claim 4 wherein
(i) component (II) is a material represented by the formula

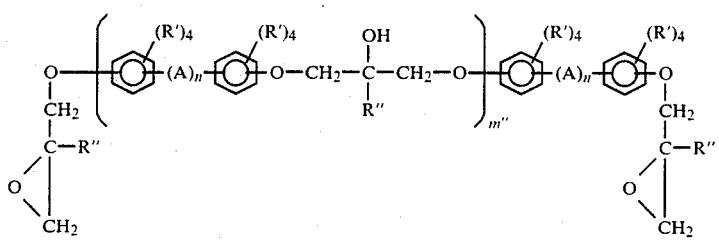

wherein each A is independently a divalent hydrocarbon group having from 1 to about 12, carbon atoms,

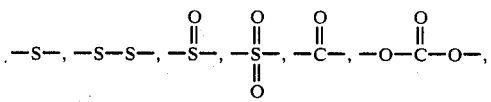

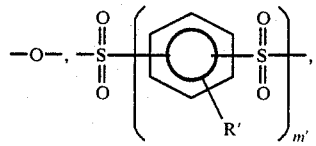

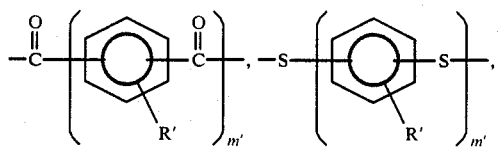

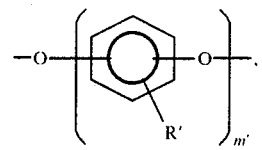

and the like; each R' is independently hydrogen or a hydrocarbyl or hydrocarbyloxy group having from 1 to about 6 carbon atoms or a halogen; each R" is independently hydrogen or a hydrocarbyl group having from 1 to about 3 carbon atoms; m" has a value from zero to about 40 and n has a value of zero or 1; and (ii) components (I) and (II) are present in quantities which provide a ratio of hydroxyl groups to epoxy groups of from about 0.1:1 to about 0.5:1.

9. An advanced epoxy resin of claim 5 wherein in component (II) A is an isopropylidene group; R" is hydrogen; m" has a value of from about 0.1 to about 5; and n has a value of 1.

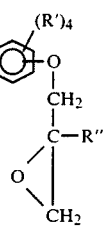

10. The product resulting from curing the epoxy resin of claim 1 with a curing quantity of a suitable curing agent or curing catalyst or combination thereof.

11. The product resulting from curing the epoxy resin of claim 2 with a curing quantity of a suitable curing agent or curing catalyst or combination thereof.

12. The product resulting from curing the epoxy resin of claim 3 with a curing quantity of a suitable curing agent or curing catalyst or combination thereof.

13. The product resulting from curing the epoxy resin of claim 4 with a curing quantity of a suitable curing agent or curing catalyst or combination thereof.

14. The product resulting from curing the epoxy resin of claim 5 with a curing quantity of a suitable curing agent or curing catalyst or combination thereof.

15. The product resulting from curing the epoxy resin of claim 6 with a curing quantity of a suitable curing agent or curing catalyst or combination thereof.

16. The product resulting from curing the epoxy resin of claim 7 with a curing quantity of a suitable curing agent or curing catalyst or combination thereof.

17. The product resulting from curing the epoxy resin of claim 8 with a curing quantity of a suitable curing agent or curing catalyst or combination thereof.

18. The product resulting from curing the epoxy resin of claim 1 with a curing quantity of a suitable curing agent or curing catalyst or combination thereof.

* * * * *